US007937985B2

(12) United States Patent
Chambon

(10) Patent No.: US 7,937,985 B2
(45) Date of Patent: May 10, 2011

(54) CHECKING APPARATUS FOR CHECKING OPERATION OF A DENSIMETER FOR MEDIUM-VOLTAGE AND HIGH-VOLTAGE ELECTRICAL EQUIPMENT, AND A METHOD OF CHECKING OPERATION OF A DENSIMETER

(75) Inventor: David Chambon, Batiment les Pins 5 (FR)

(73) Assignee: Areva T&D SA, Paris (FR)

( * ) Notice: Subject to any disclaimer, the term of this patent is extended or adjusted under 35 U.S.C. 154(b) by 715 days.

(21) Appl. No.: 11/860,144

(22) Filed: Sep. 24, 2007

(65) Prior Publication Data

US 2008/0078237 A1 Apr. 3, 2008

(30) Foreign Application Priority Data

Sep. 28, 2006 (FR) ..................................... 06 53999

(51) Int. Cl.
*G01L 27/00* (2006.01)

(52) U.S. Cl. ........................................................ 73/1.68

(58) Field of Classification Search ........................ None
See application file for complete search history.

(56) References Cited

U.S. PATENT DOCUMENTS

| | | | | |
|---|---|---|---|---|
| 2,989,863 | A * | 6/1961 | Guglielmo et al. | 73/49.3 |
| 3,273,348 | A * | 9/1966 | De Hart, Jr. | 62/49.1 |
| 4,663,692 | A * | 5/1987 | Carothers et al. | 361/117 |
| 5,537,858 | A * | 7/1996 | Bauer | 73/49.3 |
| 5,837,881 | A * | 11/1998 | Martin | 73/1.68 |
| 5,889,467 | A * | 3/1999 | Marmonier et al. | 340/605 |
| 6,125,692 | A | 10/2000 | Marmonier | |
| 6,205,846 | B1 | 3/2001 | Dupraz et al. | |
| 6,293,914 | B1 | 9/2001 | Sumanaweera et al. | |

FOREIGN PATENT DOCUMENTS

| | | | |
|---|---|---|---|
| EP | 0 309 385 | A1 | 3/1989 |
| EP | 0 476 906 | A2 | 3/1992 |
| EP | 0 911 845 | A1 | 4/1999 |
| FR | 2 170 847 | | 9/1973 |
| FR | 2 770 295 | | 4/1999 |
| WO | WO 2004/027804 | A2 | 4/2004 |

* cited by examiner

*Primary Examiner* — Robert R Raevis

(74) *Attorney, Agent, or Firm* — Oblon, Spivak, McClelland, Maier & Neustadt, L.L.P.

(57) ABSTRACT

Checking apparatus for checking operation of a densimeter for medium-voltage or high-voltage equipment having metal casing (4) that is filled with a dielectric gas under pressure; the apparatus comprises a closed chamber (8) suitable for being put into communication with an internal space (5) of the casing (4), and isolation means (10) for isolating the chamber (8) in gastight manner from the internal space (5), in which apparatus said closed chamber (8) has a volume that can be caused to vary, and in which apparatus the densimeter is suitable for detecting at least one pressure threshold in said chamber.

19 Claims, 3 Drawing Sheets

CHECKING APPARATUS FOR CHECKING OPERATION OF A DENSIMETER FOR MEDIUM-VOLTAGE AND HIGH-VOLTAGE ELECTRICAL EQUIPMENT, AND A METHOD OF CHECKING OPERATION OF A DENSIMETER

TECHNICAL FIELD

The present invention relates to checking apparatus for checking a densimeter for monitoring a leakage rate from medium-voltage and high-voltage electrical equipment casing that is filled with a dielectric gas under pressure, in which apparatus the polluting effects of the checking on the environment are reduced. The invention also relates to a method of checking the operation of said densimeter.

A densimeter or density sensor is, for example, applied to a switch or to a circuit-breaker, to a substation that has insulating or metal casing, or to a substation that has gastight metal-casing containing a dielectric gas, e.g. sulfur hexafluoride ($SF_6$) under a pressure of a few bars. The densimeter is fastened to the casing and is subjected to the gas pressure in order to measure the gas pressure inside the casing continuously. Since leaks, however small, are inevitable, the density or pressure of the dielectric gas inside the casing tends to decrease. Below a predetermined threshold, proper operation of the circuit-breaker is no longer ensured. It is then necessary to inject a certain quantity of gas in order to go back above the critical threshold.

When said threshold is crossed, an alarm is activated in order to inform the maintenance department. The alarm is activated on the basis of the measurements taken by the densimeter or pressure gauge.

Such densimeters are, for example, known from Documents FR 2 770 295, Wo 2004/027804, and U.S. Pat. No. 6,293,914.

In conventional manner, a densimeter has two contact thresholds that switch over on loss of gas density in the casing. The first contact threshold corresponds to an "alarm" threshold P1 that informs the operator of the need to take action by topping up the gas, and the second threshold P2 corresponds to a density value below which the electrical characteristics and the breaking performance of the equipment under gas pressure are no longer guaranteed, in particular for interrupting the current when a short-circuit fault occurs, depending on the conditions and/or operating requirements of the grid. As soon as said second threshold is reached, the customer gives an "open" instruction and locks the equipment in the open position, or else, the customer maintains the equipment locked in the closed position as a function of various parameters, in particular the variation in the pressure and in the temperature of the gas, and the current-breaking performance of the electrical equipment.

The densimeter is thus an important safety member; it is therefore necessary to make regular checks to verify that its contacts are operating properly, on the basis of a pressure/temperature scale.

Such verification is performed at regular intervals by simulating a dielectric gas leak, in particular during preventive maintenance.

For that purpose, the densimeter is isolated from the inside of the casing, and is thus isolated in a chamber. Then the gas is caused to escape to the outside environment and the behavior of the densimeter is checked, in order to verify that it does indeed detect the pressure reduction during the gas leak to the outside environment, and that it reacts accordingly.

Unfortunately, $SF_6$ is a greenhouse gas and it is therefore preferable to minimize leakage of it to the outside environment.

In circuit-breakers, the quantity of gas implemented in each item of casing is very small. However, in view of the number of circuit-breakers and of other electrical substations containing such a gas, even small gas leaks repeated for checking that densimeters are operating properly can represent a non-negligible quantity of greenhouse gas.

Therefore, an object of the present invention is to provide a device for verifying operation of a densimeter that avoids such pollution.

Another object of the present invention is to provide a non-polluting method of checking a densimeter.

SUMMARY OF THE INVENTION

The above-mentioned object is achieved by checking apparatus for checking operation of a densimeter, which apparatus includes a chamber that is sealed relative to the outside environment and whose volume can be increased in order to reduce its internal dielectric gas pressure to the level of a trigger threshold of the electrical switchgear, the densimeter being suitable for measuring the gas pressure in said chamber.

A gas leak is thus simulated by reducing the pressure of the gas inside the closed chamber whose volume has been increased.

In other words, instead of causing a genuine leak to occur in order to check operation of the densimeter, a reduction in pressure is generated in a closed volume containing a constant mass of gas.

By means of the present invention, no volume of gas is deliberately discharged into the environment, and operation of the metal-clad electrical equipment under normal conditions thus no longer pollutes by discharging greenhouse gas, while the operating conditions of such equipment are nevertheless monitored effectively.

The present invention thus mainly provides checking apparatus for checking operation of a densimeter for medium-voltage or high-voltage equipment having metal casing that is filled with a dielectric gas under pressure, said apparatus comprising a closed chamber suitable for being put into communication with an internal space of the casing, and isolation means for isolating the chamber in gastight manner from the internal space, in which apparatus said closed chamber has a volume that can be caused to vary, and in which apparatus the densimeter is suitable for detecting at least one pressure threshold in said chamber.

Advantageously, the isolation means comprise a valve that is caused to open and to close by modifying the volume of the closed chamber. It is then not necessary to make provision for synchronizing isolating the closed chamber and modifying the volume of the closed chamber, and the checking apparatus is then simple to implement.

For example, the checking apparatus may include a body that is integral with the casing, and a lid, said body and said lid defining the closed chamber, said lid being suitable for sliding in gastight manner in the body in order to modify the volume of the closed chamber.

In addition, provision is advantageously made for the lid to cause the valve to open and to close.

The valve may include a stem and a valve closure member, said valve closure member serving to co-operate in gastight manner with a seat surrounding a communication passageway between the closed chamber and the internal space of the casing, said stem being suitable for being moved by the lid in order to open or to close the valve closure member. Valve opening and valve closure is thus controlled in a manner that is very simple and robust.

For example, the checking apparatus includes screws connecting the lid to the body and making it possible for said lid to slide over a determined stroke.

The present invention also provides medium-voltage and high-voltage electrical equipment having gastight metal casing filled with a dielectric gas under pressure, the equipment comprising at least one checking apparatus of the present invention, and a densimeter suitable for measuring at least one gas pressure threshold in the chamber of the checking apparatus.

The present invention also provides a method of checking operation of a densimeter for medium-voltage and high-voltage electrical equipment having metal casing that is filled with a dielectric gas under pressure, said method comprising the following steps:

isolating the densimeter in a closed chamber;

expanding the volume of said closed chamber until a predetermined pressure threshold is reached in said chamber; and verifying the behavior of the densimeter.

The densimeter is advantageously isolated by the expanding of the volume of the chamber.

In one implementation, the step of verifying the behavior of the densimeter makes provision for detecting a switch-over of alarm contacts and for opening the circuit-breaker.

BRIEF DESCRIPTION OF THE DRAWINGS

The present invention can be better understood on reading the following description and on examining the accompanying drawings, in which.

DETAILED DESCRIPTION OF PARTICULAR EMBODIMENTS

Figure 1:
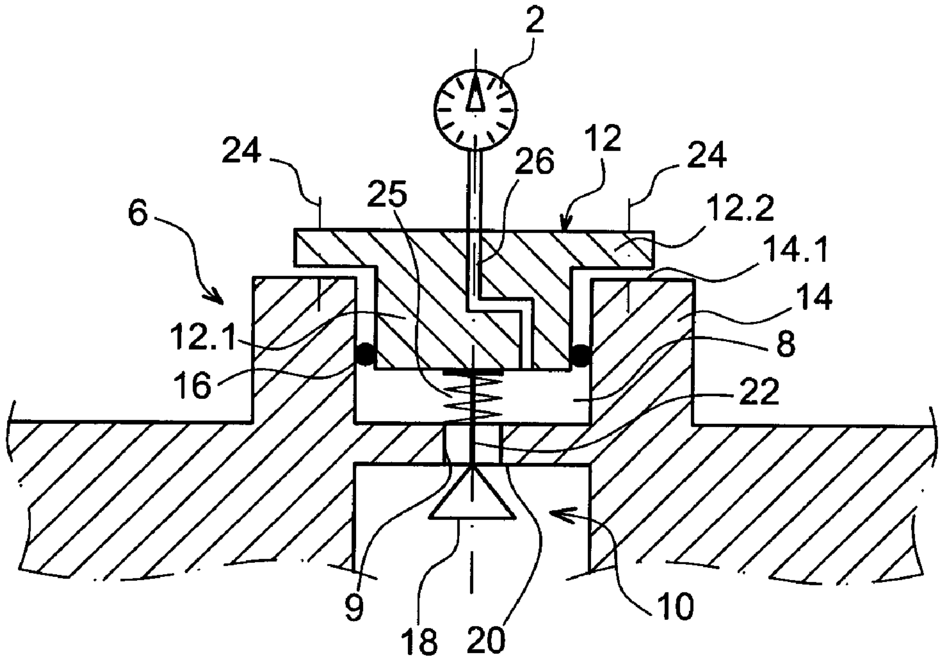
FIG. 1 is a diagrammatic section view of checking apparatus of the present invention in a normal monitoring state.

FIG. 1 is a diagrammatic section view of an embodiment of checking apparatus of the invention for checking operation of a densimeter, which checking apparatus is mounted on metal casing 4 of a high-voltage circuit-breaker or of high-voltage electrical equipment.

The casing defines an internal space 5 that is filled with a dielectric gas under pressure, e.g. sulfur hexafluoride ($SF_6$) under gas pressure of 7 bars gauge at 20° C.

Figure 4:
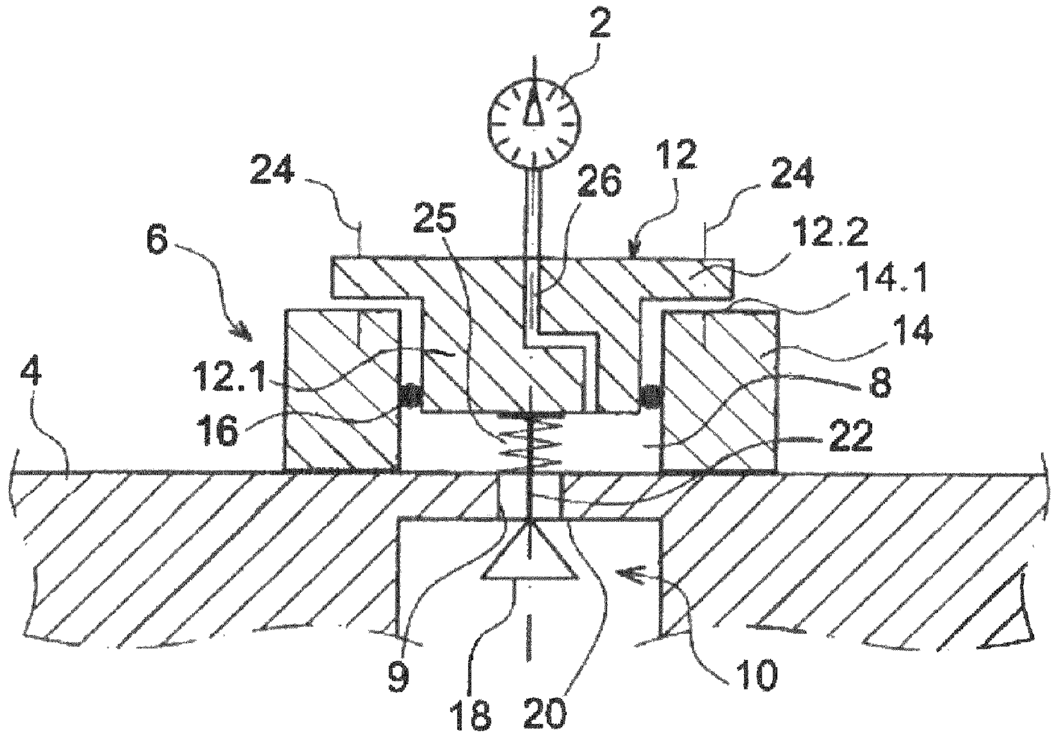
FIG. 4 is a diagrammatic section view of the checking apparatus of the present invention according to an embodiment where the housing is mountable on the metal casing.

The checking apparatus includes a housing 6 secured to or integral with the casing 4. In FIG. 1, the housing is formed integrally in one piece with the casing 4, thereby making it possible to avoid problems of sealing between the housing and the casing 4. FIG. 4 depicts an embodiment where the housing 6 is mountable on the casing 4.

The housing 6 defines an internal chamber 8 suitable for being put into communication with the internal space 5 of the casing 4 via a channel 9.

Thus, when the chamber 8 is in communication with the space 5, the pressure prevailing in the chamber 8 is equal to the pressure prevailing in the space 5.

In the example, shown, a densimeter 2 is mounted in gastight manner on the housing 6 and serves to measure the $SF_6$ pressure in the chamber 8.

The densimeter is suitable for detecting at least one pressure threshold, and advantageously two pressure thresholds; a first threshold P1 corresponding to an alarm threshold corresponding to the need to take action on the densimeter, and a second threshold P2 corresponding to operation of the electrical equipment no longer being guaranteed, in particular the current not being interrupted when a short-circuit fault occurs. In which case, the equipment is either open and locked in the open position, or locked in the closed position.

The densimeter 2 is connected to a processing unit (not shown) suitable for indicating to users the state of the electrical equipment.

In accordance with the present invention, the chamber 8 has a volume that is suitable for varying.

In the example shown, the housing 6 has a top portion 12 that forms a lid, and a body 14 on which the lid 12 is mounted in gastight manner. The lid 12 is suitable for being moved in gastight manner relative to the body so as to modify the volume of the chamber 8.

In the example shown, the lid 12 has a smaller-diameter portion 12.1 and a larger-diameter portion 12.2 forming a base, the smaller-diameter portion 12.1 being mounted to slide in the body 14.

Dynamic sealing means 16 are provided between the lid 12 and the body 14 in order to provide sealing by friction while the lid is moving in the body 14. For example, said dynamic sealing means are mounted in a groove provided in an outside periphery of the smaller-diameter portion 12.1. For example, the sealing means are constituted by an O-ring seal or by a lip seal.

The base 12.2 is designed to come into abutment against a free end 14.1 of the body 14.

The checking apparatus also includes means 10 for isolating the chamber 8 from the volume 5 in gastight manner.

In the example shown, the means 10 are formed by a valve comprising a valve closure member 18 and a seat 20 surrounding the channel 9.

Advantageously, the valve closure member 18 is urged resiliently back into contact with the seat 20 so as to close off the channel 9, e.g. by means of a helical spring 25.

Advantageously, the valve is opened and closed directly by moving the lid 12. The valve has a valve closure member stem 22 that is integral with the valve closure member, that is mounted in the channel 9, and that projects into the chamber 8.

A free end 22.1 of the valve closure member stem 22 is suitable for coming into contact with the lid 12, and for being moved in the valve-opening direction indicated by the arrow F by the lid 12.

The spring 25 is mounted in reaction between an end 9.1 of the channel 9 that is opposite from the end carrying the valve seat 20 and the free end 22.1 of the valve closure member stem 22.

This embodiment offers the advantage of being simple and robust; it is then not necessary to provide external control means that are voluminous and exposed to bad weather. In addition, the valve is controlled without requiring additional external elements.

However, a solenoid valve controlled from the outside of the housing 6, for mutually isolating the chamber 8 and the space 5, lies within the ambit of the present invention.

In the example shown, a second channel 26 is provided in the lid 12 in order to bring the pressurized gas to the densimeter. However, it is possible to make provision for the densimeter to open out directly into the chamber 8.

The lid 12 is fastened directly to the body 14, e.g. by means of screws (not shown), e.g. four screws. When said screws are tightened, the checking apparatus is in the configuration shown in FIG. 1, and the volume of the chamber 8 is at its minimum. When the screws are in the fully loosened state, the volume of the chamber 8 is at its maximum.

Retaining means 24 for retaining the lid 12 on the body 14 are also provided. Said means also form guide means making it possible to move the lid relative to the body over a given stroke in order to avoid loss of gastightness between the lid 12 and the body 14.

The retaining means 24 are, for example, formed by screws held captive on the body 4 so that they cannot be lost.

Any other system, e.g. a threaded lid with a tapped body, can be considered for moving the lid in the body over a given stroke. Regardless of the system provided, the system is drivable even though the internal pressure generates an opposing force.

Operation of the checking apparatus of the present invention is described below.

In the normal monitoring state shown in FIG. 1, the chamber 8 is in communication with the space 5. The densimeter then measures the pressure prevailing in the chamber 8 and thus in the space 5.

If the gas pressure becomes less than the determined pressure threshold P2, alarm contacts switch over, and the circuit-breaker opens.

When it is desired to check operation of the densimeter:

The screws are gradually loosened. In a first stage, the lid 12 moves away from the body, thereby causing the valve closure member 18 to move towards the seat 20, until said valve closure member comes into gastight contact with the seat 20 and isolates the chamber 8 from the space 5. Then, in a second stage, the loosening of the screws is continued to cause an additional increase in the volume of the chamber 8. The lid operates as a piston.

Boyle's Law states that the volume of a mass of gas is inversely proportional to pressure, at constant temperature.

If the densimeter is operating correctly, the alarm contacts switch over and the circuit-breaker opens. Otherwise, the densimeter requires action to be taken.

The initial volume of the chamber 8 and its volume variation are determined so that the pressure prevailing in the chamber 8, when its volume is at its maximum, is less than the second pressure threshold P2 of the circuit-breaker. It is also possible that the pressure the chamber corresponds to the first threshold P1. In which case, only operation of the alarm is verified, and not switching over of the contacts.

It is also possible to verify operation of the densimeter at the different thresholds.

When the checking shows that the densimeter is operating correctly, the screws are re-tightened, thereby, in a first stage, causing the volume of the chamber 8 as isolated from the space 5 to be reduced, and then, in a second stage, at the end of the stroke of the lid 12, causing the valve to open. The densimeter is, once again, in the configuration in which it monitors the volume 5.

The densimeter has thus been checked without releasing any greenhouse gas into the outside environment. In addition, by means of the present invention, no mass of gas is taken from the casing. Thus any pressure reduction is due only to inevitable leaks and not to the checking.

It is also possible to make provision to verify operation of the densimeter when the pressure in the chamber 8 increases.

By way of example, the filling pressure is at 7 bars gauge, the alarm threshold P1 is at 6 bars, and the threshold P2 is at 5.7 bars.

If a switch-over of the thresholds is desired for a threshold P2 of 5 bars, the variation in the volume V1 once the valve 18 is closed must be increased by more than 30%.

In the example shown, the increase in the volume of the chamber 8 is achieved manually. However, mechanisms can be provided that are controlled by an electric motor and/or by hydraulic actuators.

Figure 3:
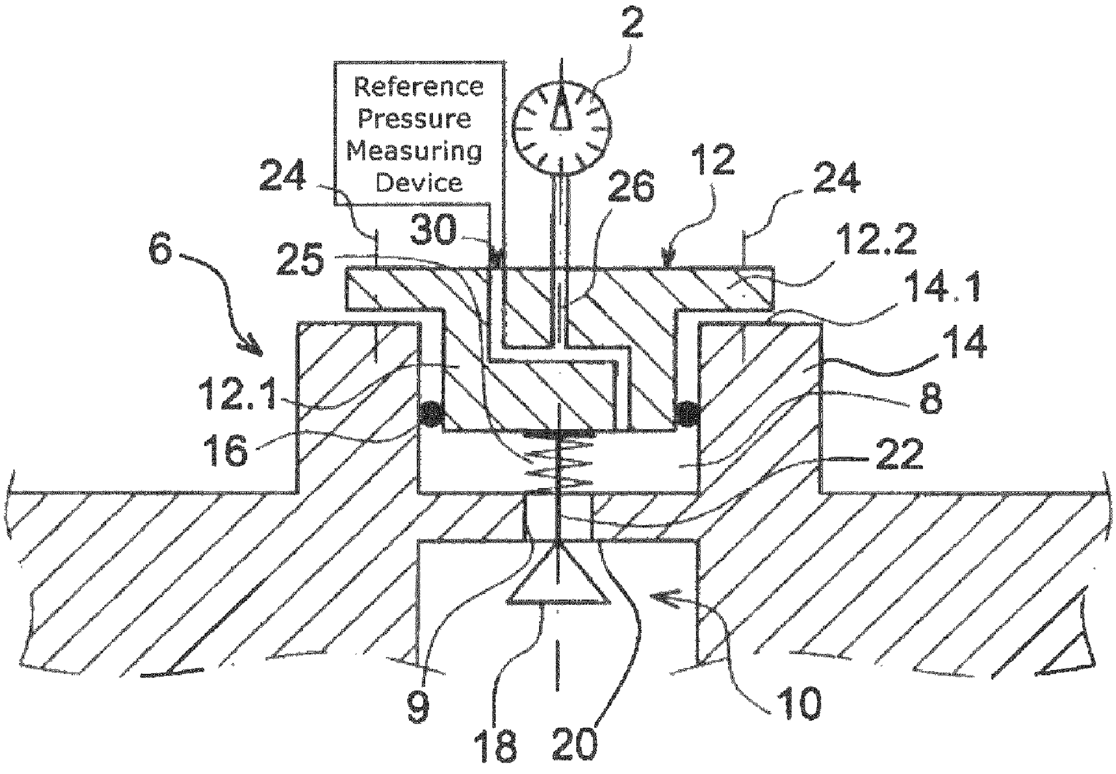
FIG. 3 is a diagrammatic section view of the checking apparatus of the present invention as provided with means for verifying the pressure value at which the densimeter reacts.

FIG. 3 shows the checking apparatus of the present invention comprising means for measuring the pressure prevailing in the chamber 8 so as to verify at what pressure value the densimeter actually triggers. In the example shown, these means comprise a channel 30 provided in the lid 12, which channel opens out into the channel of the densimeter and to the outside. A check valve is mounted in the channel 30 at its end that is open to the outside in order to enable said channel to be connected to a reference or standard pressure gauge or to any other conventional or electronic reference system (not shown). The standard pressure gauge is connected to the chamber 8 prior to causing the volume of said chamber to vary.

Figure 2:
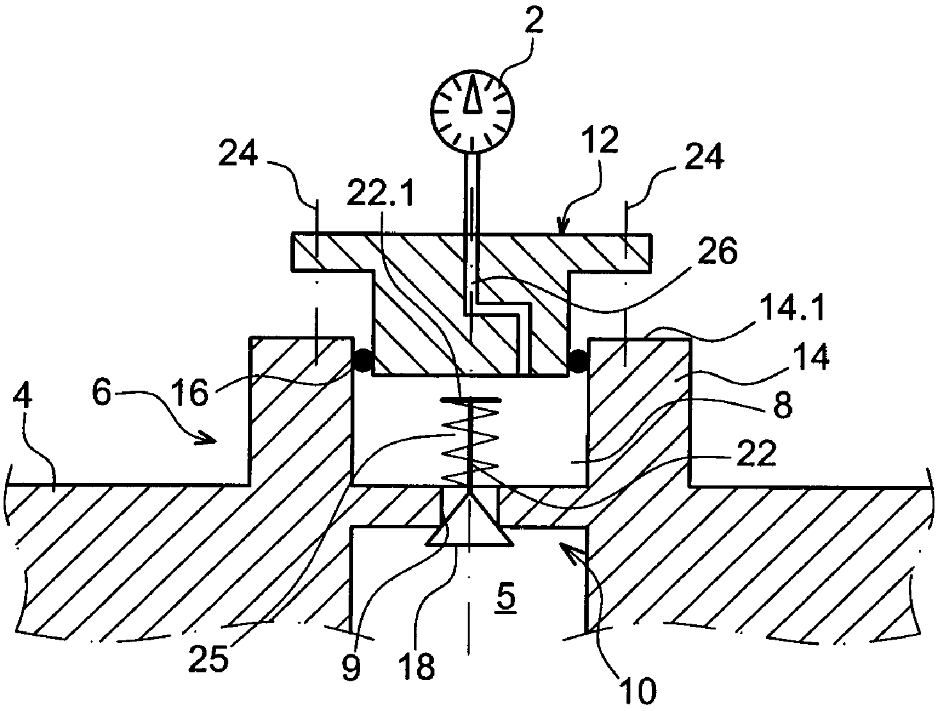
FIG. 2 shows checking apparatus of FIG. 1 in a checking state in which it is verifying operation of the densimeter.

The checking method described above with reference to the checking apparatus shown in FIGS. 1 and 2 is then implemented. When the pressure drops in the chamber 8, the pressure value that is obtained is validated by the standard pressure gauge. This is particularly advantageous in the particular case when the densimeter is not provided with a pressure display, in order to verify that the trigger pressure is indeed the desired threshold.

The densimeter of the present invention offers the advantage of being very simple to construct and to operate.

The invention claimed is:

1. A checking apparatus for checking operation of a densimeter for medium-voltage or high-voltage equipment having metal casing that is filled with a dielectric gas under pressure, the checking apparatus comprising:

a housing that is coupled with the metal casing, the housing including a closed chamber configured to communicate with an internal space of the casing, and an isolation device that isolates the chamber in a gastight manner from the internal space, the closed chamber having a volume that is variable, and the densimeter being configured to detect at least one pressure threshold in the chamber.

2. The checking apparatus according to claim 1, in which the isolation device includes a valve that is caused to open and to close by modification of the volume of the closed chamber.

3. The checking apparatus according to claim 1, wherein the housing includes a body that is integral with the casing, and a lid, the body and the lid defining the closed chamber, the lid being slideable in gastight manner in the body in order to modify the volume of the closed chamber.

4. The checking apparatus according to claim 3, further including screws connecting the lid to the body and regulating the sliding of the lid over a determined stroke.

5. The checking apparatus according to claim 3, in which the isolation device includes a valve that is caused to open and to close by modification of the volume of the closed chamber, the lid causing the valve to open and to close.

6. The checking apparatus according to claim 5, in which the valve includes a stem and a valve closure member, the valve closure member serving to co-operate in gastight manner with a seat surrounding a communication passageway between the closed chamber and the internal space of the casing, the stem being moveable by the lid in order to open or to close the valve closure member.

7. The checking apparatus according to claim 3, further including screws connecting the lid to the body and regulating the sliding of the lid over a determined stroke, in which the isolation device includes a valve that is caused to open and to close by the modification of the volume of the closed chamber, the lid causing the valve to open and to close.

8. The checking apparatus according to claim 7, in which the valve includes a stem and a valve closure member, the valve closure member serving to co-operate in gastight manner with a seat surrounding a communication passageway between the closed chamber and the internal space of the casing, the stem being moveable by the lid in order to open or to close the valve closure member.

9. The checking apparatus according to claim 1, further including a reference pressure measuring device for measuring the pressure in the chamber simultaneously with the densimeter.

10. The checking apparatus according to claim 9, wherein a reference pressure value measured by the reference pressure measuring device is used to validate a pressure threshold detected by the densimeter.

11. The checking apparatus according to claim 1, wherein the housing includes a body that is mountable on the metal casing, and a lid, the body and the lid defining the closed chamber, the lid being slideable in gastight manner in the body in order to modify the volume of the closed chamber.

12. Medium-voltage and high-voltage electrical equipment comprising:

- a gastight metal casing filled with a dielectric gas under pressure;
- a densimeter for monitoring the medium-voltage or high-voltage equipment having the metal casing that is filled with the dielectric gas under pressure; and
- at least one checking apparatus for checking operation of the densimeter, the at least one checking apparatus including
  - a housing that is coupled with the metal casing, the housing including a closed chamber configured to communicate with an internal space of the casing, and
  - an isolation device that isolates the chamber in a gastight manner from the internal space, the closed chamber having a volume that is variable, and the densimeter being configured to detect at least one pressure threshold in the chamber.

13. The medium-voltage and high-voltage electrical equipment according to claim 12, wherein the housing includes a body that is integral with the casing, and a lid, the body and the lid defining the closed chamber, the lid being slideable in gastight manner in the body in order to modify the volume of the closed chamber, the isolation device comprising a valve that is caused to open and to close by the modification of the volume of the closed chamber, the lid causing the valve to open and to close.

14. The medium-voltage and high-voltage electrical equipment according to claim 12, wherein the housing includes a body that is mountable on the metal casing, and a lid, the body and the lid defining the closed chamber, the lid being slideable in gastight manner in the body in order to modify the volume of the closed chamber.

15. A method of checking operation of a densimeter for medium-voltage and high-voltage electrical equipment having metal casing that is filled with a dielectric gas under pressure, the method comprising the following steps:

- isolating the densimeter in a closed chamber by closing communication between the closed chamber and an internal space of the metal casing;
- expanding the volume of the closed chamber from an initial volume until a predetermined pressure threshold is reached in the chamber;
- verifying the behavior of the densimeter;
- reducing the volume of the closed chamber to the initial volume; and
- reopening of the communication between the closed chamber and the internal space of the metal casing, without releasing gas in the atmosphere.

16. The method of checking according to claim 15, in which isolating the densimeter is obtained by the expanding of the volume of the chamber.

17. The method of checking according to claim 16, in which the step of verifying the behavior of the densimeter makes provision for detecting a switch-over of alarm contacts and for opening a circuit-breaker of the medium-voltage and high-voltage electrical equipment.

18. The method of checking according to claim 15, in which the step of verifying the behavior of the densimeter makes provision for detecting a switch-over of alarm contacts and for opening a circuit-breaker of the medium-voltage and high-voltage electrical equipment.

19. The method of checking according to claim 15, further including,

- after the expanding the volume of the closed chamber, obtaining a reference pressure value in the closed chamber and validating a pressure threshold detected by the densimeter using the reference pressure value.

* * * * *